US000002003P2

(19) United States

(12) Statutory Invention Registration

Minner

(10) Reg. No.: US H2003 H

(43) Published: Nov. 6, 2001

(54) IMAGE ENHANCING BRUSH USING MINIMUM CURVATURE SOLUTION

(75) Inventor: Richard T. Minner, Charmichael, CA (US)

(73) Assignee: Island Graphics Corporation, Larkspur, CA (US)

(21) Appl. No.: 09/087,284

(22) Filed: May 29, 1998

(51) Int. Cl.[7] ..... G06K 9/40

(52) U.S. Cl. ..... 382/254; 382/275; 382/293; 382/299; 382/300

(58) Field of Search ..... 382/254, 275, 382/293, 299, 300

(56) References Cited

U.S. PATENT DOCUMENTS

| | | | |
|---|---|---|---|
| 4,577,219 | | 3/1986 | Klie et al. . |
| 4,698,843 | | 10/1987 | Burt et al. . |
| 4,817,179 | | 3/1989 | Buck . |
| 4,893,181 | | 1/1990 | Yeomans . |
| 5,148,499 | | 9/1992 | Matsumura . |
| 5,197,108 | | 3/1993 | Watanabe . |
| 5,204,918 | | 4/1993 | Hirosawa . |
| 5,509,113 | | 4/1996 | Takakura et al. . |
| 5,594,816 | * | 1/1997 | Kaplan et al. ..... 382/275 |
| 5,621,868 | | 4/1997 | Mizutani et al. . |
| 5,623,558 | | 4/1997 | Billawala et al. . |

OTHER PUBLICATIONS

Briggs, Ian C., *Geophysics* vol. 39, No. 1 (Feb. 1974) pp. 34–48 "Machine Contouring Using Minimum Curvature".

* cited by examiner

*Primary Examiner*—Daniel T. Pihulic

(74) *Attorney, Agent, or Firm*—Townsend and Townsend and Crew LLP

(57) ABSTRACT

Systems and methods are provided for enhancing an image by removing defects or blemishes from the image. A user selects a region of one or more pixels to be altered or modified. Interpolation techniques are used to determine interpolated values for pixels in the selected region based on the values of pixels surrounding the selected region. Thereafter, a smoothing function determines new values for each pixel in the selected region based on the values of pixels adjacent to the pixel being smoothed. The smoothing function kernel is applied iteratively to the pixels in the selected region until the image is smoothed to a desired degree.

29 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

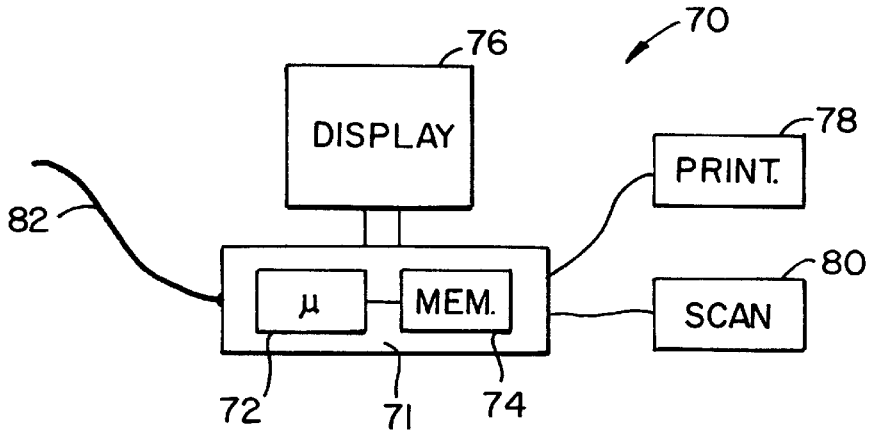
FIG. 3.
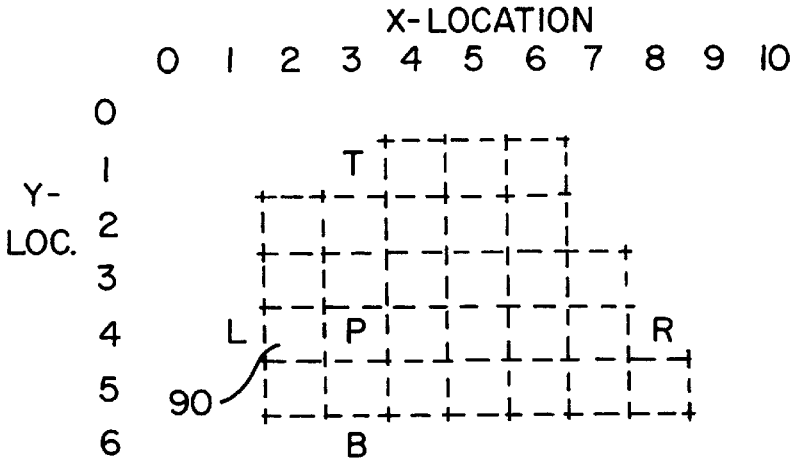
FIG. 4.
100
```
{ 0,  0,  -1,  0,  0 }
{ 0,  -2,  8,  -2,  0 }
{ -1,  8,  C,  8,  -1 }
{ 0,  -2,  8,  -2,  0 }
{ 0,  0,  -1,  0,  0 }
```
FIG. 5.

IMAGE ENHANCING BRUSH USING MINIMUM CURVATURE SOLUTION

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates generally to a technique for retouching, or removing defects or blemishes from, an image, and more specifically to a method and apparatus for recalculating values of pixels selected or identified using a computer generated brush.

When using an image processing system, it is often desirable to alter one or more pixels in an image. For example, it is desirable to correct images containing defective or missing pixels caused by imperfections in the optical equipment used to acquire the image, such as scratches, smudges or other blemishes on camera lenses, photocopier platens or on the surface of the contact glass of a scanner. It is also desirable to manipulate images by replacing selected portions and filling in those portions with a continuation of the surrounding image. For instance, one may wish to alter a picture by removing a portion of the image, such as a person or writing on a wall, while maintaining continuity with the surrounding image.

Some techniques for replacing, or correcting pixels in an image typically employ low pass filtering. However, low pass filtering often tends to blur the image. Other techniques use extrapolation based on the nearest neighbors. That is, the value of bad or missing pixels will be extrapolated based on the value of neighboring pixels having correct or valid values. These techniques can also result in a blurred image, mostly because they do not allow for smoothing of the image when there is a large variation in color in the neighboring pixels. Extrapolation techniques also can result in visual discontinuities or other visual artifacts at the edge of the filled-in region. Thus, it is clear that what is needed in the art is an improved technique for retouching, or removing defects or blemishes from, an image.

SUMMARY OF THE INVENTION

The present invention provides systems and methods for enhancing an image by removing defects or blemishes from the image. The techniques of the present invention use interpolation to determine interpolated values for pixels in a selected region based on the values of pixels surrounding the selected region. Thereafter, a smoothing function determines new values for each pixel in the region based on the values of pixels adjacent the pixels being "smoothed". The selected region comprises one or more pixels.

A user selects a portion of an image comprising one or more pixels using a computer-generated eraser brush or air brush, for example. Alternatively, a region of one or more pixels is selected by designating pixels having a certain value, or no value (i.e., missing pixels). The selected portion is erased (or the values of the pixels in the region are ignored, for example), and the erased portion is filled in so as to "blend in" with the surrounding image. That is, a new value is determined for each pixel within the selected region.

Specifically, the to-be-replaced pixels in the selected region are filled in using interpolation and a smoothing function. Initially, straight interpolation is used to fill in the to-be-replaced pixels based on the average of the pixel values of the surrounding area. For example, in a one-dimensional image, linear interpolation is used; in a two-dimensional image, four-way linear interpolation is used. A smoothing function such as a minimum curvature solution algorithm is then iteratively applied to each of the to-be-replaced pixels (now with interpolated values). The smoothing function calculates new values for the to-be-replaced pixels based on each pixel's nearest neighbors. For each iteration, the smoothing function uses the previously calculated values for each nearest neighbor pixel that lies within the selected region of to-be-replaced pixels.

According to an aspect of the invention, a method is provided for calculating new values of pixels in an image desired to be altered, comprising the steps of: providing an image including a region of first pixels desired to be altered, and a perimeter surrounding the region and comprising second pixels having known values; calculating a pixel value for each of the first pixels using linear interpolation based on at least a portion of the second pixels; applying a smoothing function to the first pixels, wherein the function recalculates the pixel values for each of the first pixels based on the value of at least the first and second pixels adjacent the pixel being recalculated, wherein the recalculation is done using the previously calculated pixel values for the first adjacent pixels; and reapplying the smoothing function if a stop condition is not satisfied.

According to another aspect of the present invention, a method is provided for enhancing a computer generated image, comprising the steps of: acquiring a digital image; selecting a portion of the image including a plurality of first pixels surrounded by second pixels having known values; calculating a pixel value for each of the first pixels using linear interpolation based on the known values of at least a portion of the second pixels; and iteratively applying a minimum curvature algorithm to the first pixels until a stop condition is satisfied, wherein the algorithm recalculates the pixel values for each of the first pixels based on the value of at least the first and second pixels adjacent to the pixel being recalculated, the recalculation using previously calculated pixel values for any of the first adjacent pixels.

According to yet another aspect of the present invention, an image processing system is provided, comprising: means for providing an image; means for selecting a portion of the image including a plurality of first pixels surrounded by second pixels having known values; a processor, wherein the processor calculates an initial pixel value for each of the first pixels using linear interpolation based on the known values of at least a portion of the second pixels, and wherein the processor thereafter iteratively applies a smoothing function to each of the first pixels until a stop condition has been satisfied, the function recalculating each of the first pixel values using the pixel values of at least the pixels adjacent the pixel being recalculated; and means for displaying the image using the recalculated values of the first pixels after the stop condition has been satisfied.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 3 depicts an exemplary image processing system;

FIG. 4 illustrates an irregular patch of pixels for which interpolated values are to be determined according to the present invention; and FIG. 5 illustrates an exemplary adjustment Kernel according to the present invention.

DESCRIPTION OF THE SPECIFIC EMBODIMENTS

Figure 1:
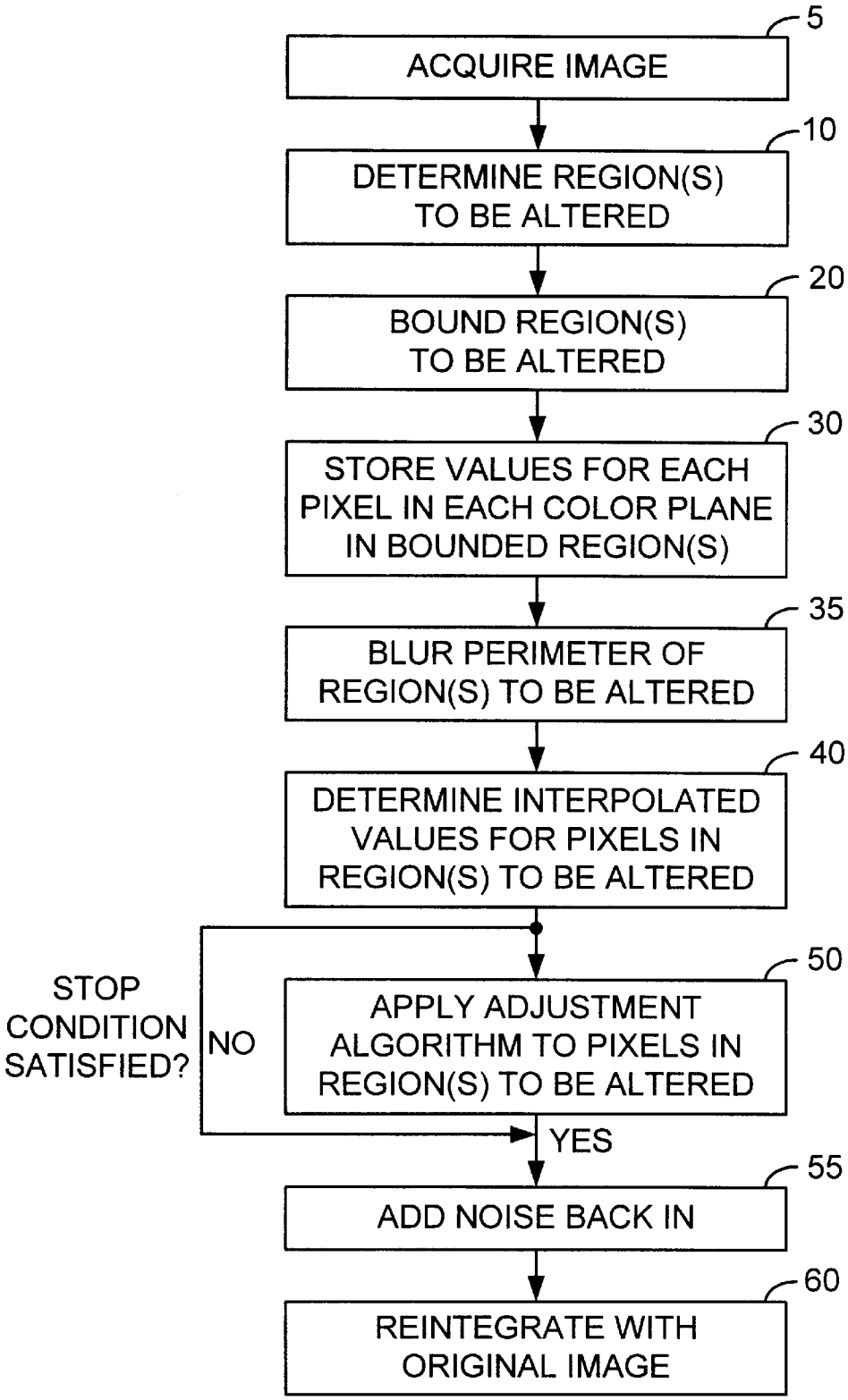
FIG. 1 depicts a flowchart which illustrates a preferred methodology according to the present invention.

FIG. 1 is a flowchart which illustrates a preferred methodology according to the present invention. A simplified description of the present invention will be made with reference to FIGS. 2*a*–2*e*, which illustrate the processing of a simplified one-dimensional grayscale image according to the present invention. Thereafter a more detailed description of a preferred embodiment will be made with reference to a two dimensional image. It will, of course, become apparent to one skilled in the art that the invention is applicable to images having more than two dimensions. Exemplary source code for implementing the preferred embodiment is included in Appendix A.

Figure 2A:
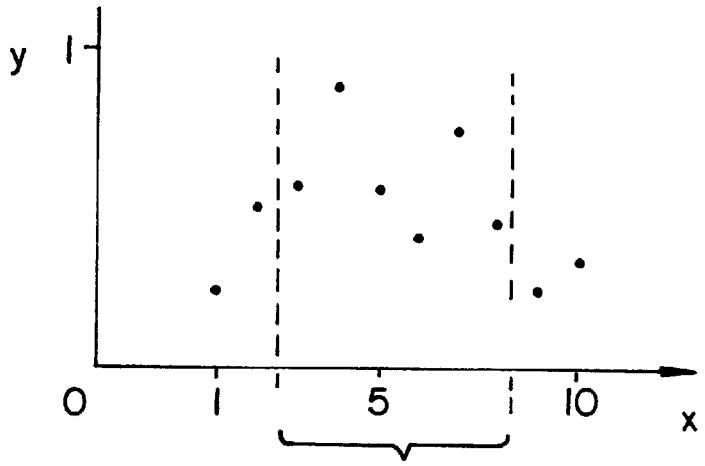
FIGS. 2*a*–2*e* illustrate the processing of a simplified one-dimensional grayscale image according to an embodiment of the present invention.

FIG. 2*a* illustrates a portion of a one-dimensional grayscale image that is desired to be altered. As shown, the one-dimensional image is represented in two dimensions, wherein the x-axis corresponds to the pixel numbers, and the y-axis corresponds to the pixel value, for example, the color or intensity value. Although theoretically a pixel can take on any value, the actual value assigned to a pixel is limited by the resolution of the system. For example, many systems use an 8-bit pixel value (byte-valued pixel) representing 256 intensity levels (i.e., pixels take on intensity values between 0 and 255). Thus, for the sake of simplicity, the pixel value has been normalized to 1 (i.e., pixels can take on intensity values between 0.0 and 1.0 inclusive).

Figure 2B:
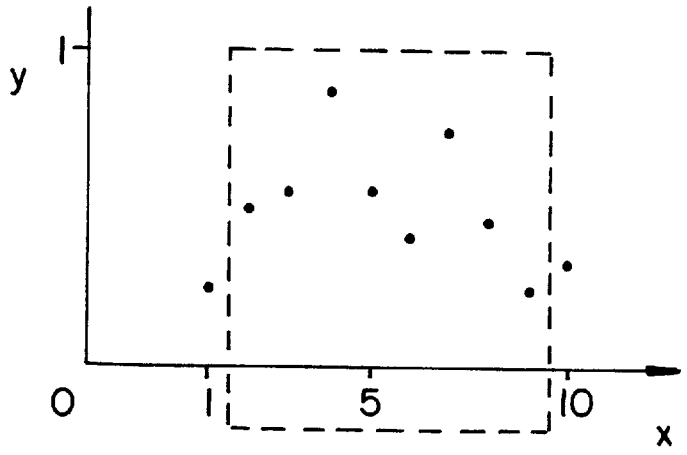
Figure 2C:
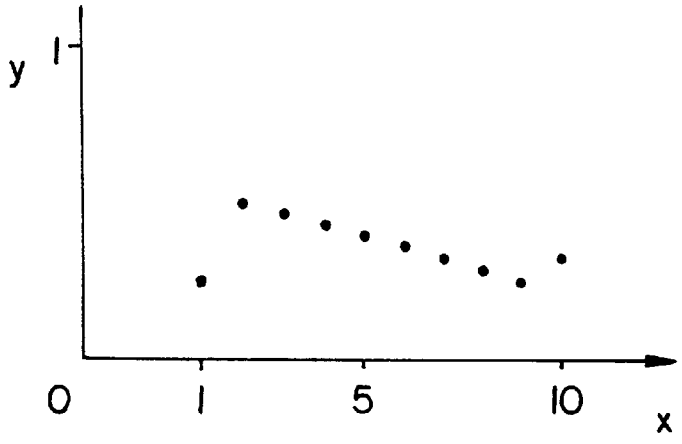

At step 5, the image is acquired, and at step 10 the portion(s) of the image to be altered is selected or identified by the user. In particular, one may desire to rid the one dimensional image of the two "spikes" (peaking at pixel nos. 4 and 7) and replace them with a smooth image. For example, the user may select or identify pixel nos. 3–8. In FIG. 2*a*, the selected portion is indicated by brackets. At step 20, the selected portion is bounded as indicated by box 22 as shown in FIG. 2*b*, which encloses the selected portion plus at least the two perimeter pixels, pixel nos. 2 and 9. At step 30, the intensity value of each pixel within the bounded region of box 22, in this case pixel nos. 2–9, is stored. Alternatively, only the values of the perimeter pixels is stored, with the values of the pixels in the selected region set to zero or ignored. At step 40, straight linear interpolation is used to generate new values for the pixels in the selected region based on the two perimeter pixels. The interpolated values are a weighted average of the values of the two perimeter pixels. The new, interpolated values are shown in FIG. 2*c*. It can be seen that in this example there is an undesirable corner effect near the perimeter pixels (i.e., the image is not smooth).

Figure 2D:
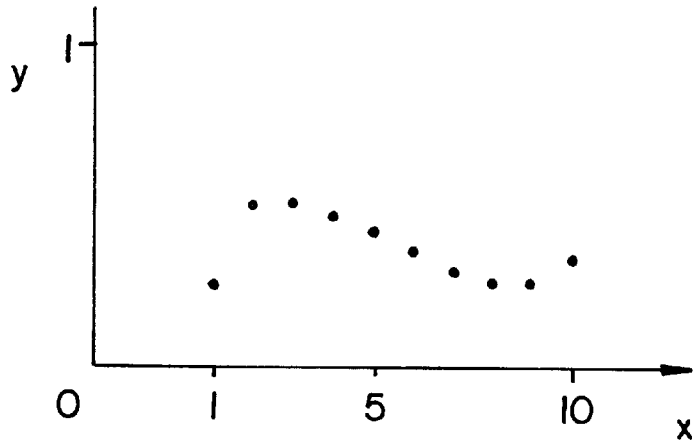
Figure 2E:
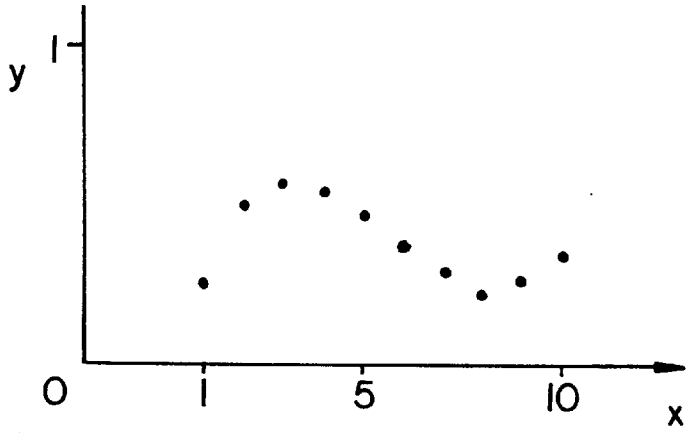

At step 50, the image is smoothed by applying an adjustment or smoothing algorithm to each of pixels 3–8 in order. According to the preferred embodiment, the smoothing algorithm is a minimum curvature solution algorithm as will be described in more detail below. According to one embodiment, the smoothing algorithm is applied iteratively for a maximum number of iterations. Alternatively, the smoothing algorithm is applied iteratively until the maximum incremental change in any of the pixels is smaller than a specified value. FIG. 2*d* shows the values of the pixels after a smoothing algorithm has been applied once. As can be seen, application of the smoothing algorithm has resulted in the values of pixel nos. 3–5 being increased slightly, and the value of pixel nos. 6–8 being decreased slightly. FIG. 2*e* shows the values of the pixels after all iterations have been completed and after the modified values have been reintegrated into the entire image according to step 60. As can be seen, the image now appears smooth.

An exemplary image processing system is depicted in FIG. 3. Image processing system 70 includes a computer system 71 comprising a microprocessor 72 and a memory 74. Microprocessor 72 performs the image processing and memory 74 stores computer code for processing images according to the present invention. Computer system 71 can be any type of computer, such as a PC a Macintosh, laptop, mainframe or the like. Imaging system 70 also includes a scanner for scanning images desired to be altered. Computer system 71 is coupled to monitor 76 for displaying a graphical user interface and master images and modified images. Computer system 71 is also coupled to various interface devices such as internal or external memory drives, a mouse and a keyboard (not shown). Printer 78 allows for the printing of any images as required by the user. Cable 82 provides the ability to download images from another computer via e-mail, the Internet, direct access or the like.

A preferred embodiment of the present invention will now be described in more detail with reference to a two dimensional image. Referring back to FIG. 1, at step 5, a two dimensional image is acquired by or provided to the system. According to the preferred embodiment, an image such as a photograph is scanned using digital scanner 80 and stored in a memory 74. Alternatively, the image may be input to and stored in the computer system in a variety of ways, including, but not limited to, importing from another computer system using a memory disk, by downloading off of the internet or via e-mail via cable 82, or inputting the image to the system from a digital camera, using a PCMCIA interface, for example.

In the preferred embodiment, at step 10, the portion of the image desired to be altered is selected using a computer generated airbrush or eraser brush. The portion selected contains one or more pixels. In an alternate embodiment, the pixels desired to be altered are identified as pixels having no value such as bad or missing pixels that are desired to be repaired and which were generated by faulty electronics, faulty camera equipment, noise, or the like. The user of the application program selects a brush size (e.g., 10 or 15 pixels wide). The brush shape is a circular disk, but it can be of some other shape as desired. The user paints an area of the image with this brush. The portion of the image painted turns black (temporarily). In one embodiment of a user interface, painting occurs while the mouse button is held down. As the mouse moves with the mouse button held down, newly-painted areas are added to a growing black area. When the mouse button is released the so-generated total black area is fixed.

According to one embodiment, at step 20, the portion(s) selected by the user is bounded by, for example, the smallest rectangle capable of enclosing the selected region plus at least one pixel between the sides of the rectangle and the selected portion (i.e., pixels on the perimeter of the selected region). Preferably, the enclosed perimeter includes several pixels between each side of the bounding rectangle and each pixel in the selected region. As will be appreciated, other geometries may be used for bounding the selected region, such as circular and triangular boundaries.

In steps 30–60, the pixels are erased and replaced with pixels having modified values as will be described in more detail below. Briefly, at step 30, an intensity value for each pixel in the bounded region is stored for each color plane; at step 40, the values of each pixel in the selected (to be modified) region are replaced with interpolated values based on the closest pixels, for example, to the left, right, top and bottom from among the pixels which are generally not to be modified (pixels on the perimeter of the selected region but within the bounded region); at step 50, an adjustment or smoothing algorithm, such as a minimum curvature solution algorithm, is applied to each of the pixels in the selected region so as to smooth out irregularities. At step 60, the modified pixel values resulting from adjustment step 50 are integrated with the original image.

Prior to step 30, the user has selected an area that is to be erased and the system has placed a bounding rectangle around this area. The system will then erase and replace pixels in the selected region one color at a time. Digital color images are composed of several color planes. Thus, according to the preferred embodiment, an image is constructed which has three planes for, successively, red, green and blue (RGB) values. Alternatively, an image can be constructed which has four planes for, successively, cyan, magenta, yellow and black (CMYK) values. Each image plane is processed separately, i.e., first the red plane is processed and then the blue plane is processed, etc. One skilled in the art will appreciate that other color systems such as YCC, HLS, CIE-Lab, CIE-XYZ and the like may be used.

The keystone procedure "erase", collectively steps 30–50, is applied once for each color plane in the image. Implemented in computer code, the color plane is indicated by a passed-in integer variable "comp" (for component). For example, if the image is encoded in RGB, procedure "erase" will be called three times, once for the red color plane, once for the blue color plane and once for the green color plane. The variable "comp" will have values 0, 1 and 2, respectively, in these three situations.

Within each color plane, each pixel (picture element) has a horizontal (x) and vertical (y) location, and has an intensity, normally either a value in the range 0 to 255 (a byte) or in the range 0 to 65535 (a pair of bytes or a word).

A rectangle full of byte-valued or word-valued pixel intensities is stored in memory 74 at step 30, for example, by passing the values into an array of double (floating point) valued numbers. According to the preferred embodiment, each byte or word is converted into a floating point number in the range 0.0 to 1.0 inclusive, by dividing by 255.0 or 65535.0, respectively.

According to one embodiment, at step 35, the area around the perimeter of the selected region is smoothed using a blurring operation such as a low-pass filtering operation, before the interpolation step 40 takes place.

At step 40, interpolated values are determined for each pixel within the selected region based on the values of the pixels on the perimeter of the selected region. According to the preferred embodiment, interpolated values for each pixel are determined in horizontal and vertical strips as will be described with reference to FIG. 4, which illustrates an irregular patch of pixels for which interpolated values are to be determined (i.e., the irregular patch represents pixels in the selected region).

Consider one of the pixels in the selected region (i.e., pixels to be erased and replaced), for example, the pixel P and location (X,Y)=(3,4). Each pixel in the selected region has four clearly defined relatives, the Left (L), Right (R), Top (T) and Bottom (B) pixels, which are the closest pixels to the left, right, top and bottom of P from among the pixels which are NOT to be erased and replaced. Each cell represents a pixel in this example.

In the particular case of pixel P:

its Left pixel, L(P) is the pixel at (X,Y)=(1,4);

its Right pixel, R(P) is the pixel at (X,Y)=(8,4);

its Top pixel, T(P) is the pixel at (X,Y)=(3,1);

its Bottom pixel, B(P) is the pixel at (X,Y)=(3,6);

Each of these four boundary pixels has a value, which is denoted by V. Hence the four values are V(L(P)), V(R(P)), V(T(P)) and V(B(P)). Each of these four boundary pixels has a distance from P. This distance is denoted by D(L(P)), etc. The distance represents the number of cell boundaries that have to be crossed to get from P to the point in question.

In this specific example:

D(L(P))=2;

D(R(P))=5;

D(T(P))=3;

D(B(P))=2.

After pixel P is erased, its value is replaced with the following new value W(P):

$$W(P) = \frac{K}{D(L(P))} * V(L(P)) + \frac{K}{D(R(P))} * V(R(P)) + \frac{K}{D(T(P))} * V(T(P)) + \frac{K}{D(B(P))} * V(B(P)); \tag{1}$$

where K is the number that causes the four coefficients:

$$\frac{K}{D(L(P))}, \frac{K}{D(R(P))}, \frac{K}{D(T(P))}, \frac{K}{D(B(P))}; \tag{2}$$

to sum to one, so that, specifically, K is the value:

$$K = \frac{1}{\frac{1}{D(L(P))} + \frac{1}{D(R(P))} + \frac{1}{D(T(P))} + \frac{1}{D(B(P))}}. \tag{3}$$

Specifically, the new value, W(P) at pixel P is a weighted average of its four neighbor pixels, L(P), R(P), T(P) and B(P) in the unerased part of the image. Each neighbor pixel should exert an influence proportional to its closeness to P, or inversely proportional to its distance from P. One way to get this effect is to use coefficients in the sum which are reciprocals of the distance from P to the neighbor sum. E.g., one such coefficient is the reciprocal 1/[D(L(P))]. This is the coefficient (except for a scale factor, K) on the value V holding at the left point L(P). Finally, the scale factor K is introduced to ensure that the value W(P) as defined in equation (1) is a weighted average. What is required is to ensure that the sum of all four coefficients sum to 1, as stated in equation (2). The necessary solved value for K is as in equation (3).

The following is a worked example corresponding to the case shown in FIG. 3 above, in which:

$$D(L(P)) = 2; \quad D(R(P)) = 5; \quad D(T(P)) = 3; \quad D(B(P)) = 2. \tag{1A}$$

$$W(P) = \frac{K}{2} * V(L(P)) + \frac{K}{5} * V(R(P)) + \frac{K}{3} * V(T(P)) + \frac{K}{2} * V(B(P));$$

where K is the number that causes the four coefficients:

$$K/2,\ K/5,\ K/3,\ K/2; \tag{2A}$$

to sum to one, so that, specifically, K is the value:

$$K = \frac{1}{\frac{1}{2} + \frac{1}{5} + \frac{1}{3} + \frac{1}{2}}. \tag{3A}$$

From (3A):

$$K = \frac{1}{\frac{15}{30} + \frac{6}{30} + \frac{10}{30} + \frac{15}{30}} = \frac{1}{\frac{46}{30}} = \frac{30}{46} = \frac{15}{23}. \tag{3A}$$

Substituting for K from (3B) into (1A) yields:

$$W(P) = \frac{15}{46} * V(L(P)) + \frac{6}{46} * V(R(P)) + \frac{10}{46} * V(T(P)) + \frac{15}{46} * V(B(P)). \tag{1B}$$

According to the preferred embodiment, each selected pixel P is replaced by a weighted average of its four not-to-be-erased neighbors L(P), R(P), T(P) and B(P) as shown above with reference to FIG. 3.

In an alternate embodiment, the specific weighted sum of equations (1), (2) and (3) is constructed by making two successive passes over the image. For example, in one embodiment, represented as computer code, the first pass is a row-priority pass with embedded loops of the form of interp1_horz( ):

```
for (int y=0; y<dim_.y( ); ++y, vY+=inc( ), dY+=inc( ),
    fY+=inc( )) for (int x=1; x<dim_.x( ); ++x, ++v, ++d,
    ++f)
```

in which the embedded loop steps across horizontal lines of the image rectangle. The second pass is a column-priority pass with embedded loops of the form of interp2_vert( ):

```
for (int x=0; x<dim_.x( ); ++x, ++vX, ++dX, ++fX) for
    (int y=1; y<dim_.y( ); ++y, v+=inc( ), d+=inc( ),
    f+=inc( ))
```

in which the embedded loop steps down vertical lines of the image rectangle. The first pass in interp1 '_horz accumulates a partial sum of the quantities in equations (1) and (3).

Within the interp procedures (see Appendix A), a pixel is inside the to-be-replaced part (the selected region) if *f=1. Procedure interp1_horz first looks for runs of to-be-replaced pixels. Having found a horizontal run of such pixels, the procedure computes and stores partial sums of the weighted value W(P) (as used in (1) above) and of the quantity 1/K, with K corresponding to K in (3) above. According to this embodiment, the relevant chunk of code in interp1_horz includes two key lines:

$$*pv = v1/frac1 + v2/frac2; \tag{4}$$

$$*pd = 1.0/frac1 + 1.0/frac2; \tag{5}$$

Using the terminology introduced earlier, equation (4) is equivalent to:

$$*pv = \frac{V(L(P))}{D(L(P))} + \frac{V(R(P))}{D(R(P))}; \tag{4A}$$

from which it is clear that *pv is a portion of the sum W(P), without the factor K, and equation (5) is equivalent to:

$$*pd = \frac{1}{D(L(P))} + \frac{1}{D(R(P))}; \tag{5A}$$

from which it is clear that *pd is a portion of the sum that constitutes the denominator of the factor K in equation (3). The values *pv and *pd are stored for every pixel which is within the to-be-replaced part of the image rectangle.

Procedure interp2_vert then makes passes over successive vertical columns of the image rectangle. According to this embodiment, the relevant chunk of code in interp2_vert includes two key lines:

$$double\ d = *pd + 1.0/frac1 + 1.0/frac2; \tag{6}$$

$$*pv = (*pv + v1/frac1 + v2/frac2)/d; \tag{7}$$

The quantity "*pd" of equation (6) is the quantity expanded in equation (5) and translated into the earlier notation in equation (5A). The quantity "1.0/frac1+1.0/frac2" in equation (6) is the same as the earlier notation's "1/D(T(P))+1/D(B(P))". Hence equation (6) is, in the earlier notation:

$$d = \frac{1}{D(L(P))} + \frac{1}{D(R(P))} + \frac{1}{D(T(P))} + \frac{1}{D(B(P))}; \tag{6A}$$

The latter is identical to 1/K in the earlier notation. The quantity "*pv" on the right side of equation (7) is the quantity expanded in equation (4) and translated into the earlier notation in (4A). The quantity "v1/frac1+v2/frac2" in equation (7) is the same as the earlier notation's "V(T(P))/D(T(P))+V(B(P))/D(B(P))". Hence equation (7) is, in the earlier notation:

$$W(P) = \frac{K}{D(L(P))} * V(L(P)) + \frac{K}{D(R(P))} * V(R(P)) + \frac{K}{D(T(P))} * V(T(P)) + \frac{K}{D(B(P))} * V(B(P)); \tag{1C}$$

where K is the number that causes the four coefficients:

$$\frac{K}{D(L(P))},\ \frac{K}{D(R(P))},\ \frac{K}{D(T(P))},\ \frac{K}{D(B(P))}; \tag{2C}$$

to sum to one, so that, specifically, K is the value:

$$K = \frac{1}{\frac{1}{D(L(P))} + \frac{1}{D(R(P))} + \frac{1}{D(T(P))} + \frac{1}{D(B(P))}}. \quad (3C)$$

Equations (1C)–(3C) are identical to equations (1) to (3), respectively, so that equation (7) is precisely the same quantity defined in equations (1) to (3) above.

Once interpolated values for the pixels in the selected region have been determined, at step 50 an adjustment algorithm is applied to each of the pixels in the selected region so as to smooth out the image. According to the preferred embodiment, the adjustment algorithm is a minimum curvature solution algorithm. An exemplary minimum curvature solution algorithm is disclosed in the article, "Machine Contouring Using Minimum Curvature", Briggs, Ian C., *Geophysics*, Vol. 39, No. 1 (February 1974), pp. 39–48, which is hereby incorporated by reference in its entirety.

An exemplary adjustment Kernel according to the present invention is shown in FIG. 5. The Kernel 100 is applied to each pixel within the selected region in an iterative manner. That is, kernel 100 is applied to each pixel in the selected region in an order, such as row-by-row or column-by-column until all pixels within the selected region have been recalculated. The kernel 100 is then reapplied until a stop condition has been satisfied. In the preferred embodiment, the stop condition is satisfied after a specified number N of iterations (i.e., number of times the kernel has been applied to the whole selected region). For example, two iterations indicates that each pixel within the selected region has been operated on twice by the adjustment kernel. In alternate embodiments, the stop condition is satisfied when the sum of the changes in each of the pixels from one iteration is smaller than a specified value as determined by the user, when the average change in the values of the pixels from one iteration is smaller than a specified value, or when the maximum change in any of the pixels is smaller than a specified value.

The center C of kernel 100 represents the pixel currently being operated on. The values (0), (−1), (−2), and (8) represent the values to be applied to the surrounding pixels when recalculating values for the pixel being operated on. For example, the values of pixels immediately adjacent the pixel being operated on to the left, right, top and bottom are multiplied by (8), whereas the values of the pixels spaced two cell boundaries to the left, right, top and bottom from the pixel being operated on are multiplied by (−1). According to the preferred embodiment, the exemplary kernel is represented in computer code as follows:

```
#define V(x,y)( *(p+(x)+inc( )*(y))) double v=8./20.*(V
  (+1,0)+V(−1,0)+V(0,−1)+V(0,+1))  −2./20.*(V(+1,+
  1)+V(−1,+1)+V(+1,−1)+V(−1,−1))  −1./20.*(V(+2,0)+
  V(0,+2)+V(−2,0)+V(0,−2));
#undef V
```

Hence, it is clear that when a pixel adjacent to the perimeter of the selected region is being operated on by the adjustment kernel 100, for example pixel 90 at location (X,Y)=(2,4) in FIG. 4, the values of any perimeter pixels are used. Also, during the first iteration, the previously interpolated values of pixels within the selected region are used for the smoothing calculation, whereas during subsequent iterations the values of the pixels in the selected region as recalculated by the previous iteration of the adjustment algorithm are used.

According to one embodiment, at step 55, after the selected region has been modified/smoothed out, background noise is added to the smoothed out portion of the image when the master image has an overall texture or graininess. According to this embodiment, a measurement is taken of the high frequency or noise component of the area around the bounded region. This component is then added back into the smoothed out area to add texture or graininess.

At step 60, the modified selected region is reintegrated with the master image and presented to the user as desired. In the preferred embodiment, the entire bounded region, for example the bounded rectangular region is reintegrated with the master image, but the system may be configured to only reintegrate the selected portion within the bounded region.

The selected region specified above need not be a single contiguous region. It may include a plurality of disconnected subregions. Some of the disconnected subregions can include islands of one or more unselected pixels. In such cases, the selected region includes all the pixels that have been selected for replacement by interpolation from the unselected pixels, regardless of their contiguity relationships to one another.

While the above is a complete description of the preferred embodiments of the invention, various alternatives, modifications, and equivalents may be used. Therefore, the above description should not be taken as limiting the scope of the invention which is defined by the appended claims.

APPENDIX A

```
//=========================================================================
//Copyright:                    (C) 1997 Island Graphics Corporation
//                              All Rights Reserved
//=========================================================================
/*
Procedure "erase" runs the whole scenario.
void ImfOp__DefectErase__Work__::erase(ImfOp__DefectErase__OnePlane& ep, int comp)
{
    copyPlaneFromBuf(ep,comp);  // 1.   Get a local copy of one color plane of
                                        the image.
    ep.blur( );                 // 2.
    ep.interp( );               // 3.   Put the patch over the pothole.
    ep.iterate( );              // 4.   Go over the patch with the buffer.
    ep.addBackNoise( );         // 5.
    copyPlaneToBuf(ep,comp);    // 6.   Restore the modified local color plane
                                        to the real image.
}
/* 1.
Procedure "copyPlaneFromBuf"
```

APPENDIX A-continued

```
// 1
void ImfOp__DefectErase__Work__::copyPlaneFromBuf(ImfOp__DefectErase__OnePlane&
 ep, int comp)
{
    double*  vpY = ep.vp(0,0);
    double*  vp;
    int      vInc = ep.inc( );
    int      x,y;
    int Ymin, Ymax, bYinc;
    int Xmin, Xmax, bXinc;
    switch(ras__.depthLog2( ))
    {
    case 3:
        {
            IrsAccessConst<unsigned char> a(ras__);
            const insigned char *bY = a.ptr( );
            Ymin = r__.minY( );
            Ymax = r__.maxY( );
            bYinc = a.incs( ).y( );
            Xmin = r__.minX( );
            Xmax = r__.maxX( );
            bXinc = a.incs( ).x( );
            for(y=Ymin; y<Ymax; ++y, bY+=bYinc, vpY+=vInc)
            {
                const unsigned char *b = bY;
                vp = vpY;
                for(x=Xmin; x<Xmax; ++x, b+=bXinc, ++vp)
                    *vp = b[comp] / 255.0;
            }
        }
        break;
    case 4:
        {
            IrsAccessConst<unsigned short> a(ras__);
            const unsigned short *bY = a.ptr( );
            for(y=r__.minY( ); y<r__.maxY( ); ++y,bY+=a.incs( ).y( ),vpY+=vInc)
            {
                const unsigned short *b = bY;
                vp = vpY;
                for(x=r__.minX( ); x<r__.maxX( ); ++03 x, b+=a.incs( ).x( ),++vp)
                    *vp = b[comp] / 65535.0;
            }
        }
        break;
    default:
        IgcHurl( );
    }
}
/* 2.
Procedure "blur"
// 2
void ImfOp__DefectErase__OnePlane::blur( )
{
    IGC__SCAF(if (!ImfOp__DefectErase__DoBlur( ))
        return;
    )
    //XXX1:
}
/* 3
Procedure "interp"
// 3
void ImfOp__DefectnessErase__OnePlane::interp( )
{
    IGC__SCAF(if (!ImfOp__DefectErase__DoInterp( ))
        return;
    )
    interp1__horz( );    // 3A
    interp2__vert( );    // 3B
}
// 3A
void ImfOp__DefectErase__OnePlane::interp1__horz( )
{
    IGC__SCAF(if (!ImfOp__DefectErase__DoInterp1( ))
        return;
    )
double      *v, *vY, *d, *dY;
const char  *f, *fY;
vY = vp(0,0);
dY = dp(0,0);
```

APPENDIX A-continued

```
fY = fp(0,0);
for  ( int y = 0;
       y < dim__.y( );
       ++y, vY+=inc( ), dY+=inc( ), fY+=inc( ))
{
     v = vY;
     d = dY;
     f = fY;
     double    minV = *v;          // value on min end, just before span
     double*   minVp = 0;          // pointer to min end of span
     double*   minDp = 0;
     int       len = 0;            // length of span
     ++v, ++d, ++f;
     for (int x = 1; x < dim__.x( ); ++x, ++v, ++d, ++f)
     {
          if (!minVp)
          {
               if (*f)
               {
                    minvP = v;     // note min end
                    minDp = d;
                    len = 1;
               }
               else
               {
                    minV = *v;
               }
          }
          else
          {
               if (*f)
               {
                    ++len;
               }
               else
               {
                    // at one past right end, time to interp
                    int       frac1   = 1;
                    int       frac2   = len;
                    double    v1      = minV;
                    double    v2      = *v;
                    double    *pv     = minVp;
                    double    *pd     = minDp;
                    for (; frac2 >= 1; ++frac1, --frac2, ++pv, ++pd)
                    {
                         *pv = v1/frac1 + v2/frac2;
                         *pd = 1.0/frac1 + 1.0/frac2;
                              IGC__SCAF(if(!ImfOp__DefectErase__DoInterp2( ))
                                   *pv /= *pd;
                              )
                         }
                         // and reset.
                         minV = *v;
                         minVp = 0;
                         minDp = 0;
                         len = 0;
                    }
               }
          }
     }
}
// 3B
void ImfOp__DefectErase__OnePlane::interp2__vert( )
{
     IGC__SCAF(if (!ImfOp__DefectErase__DoInterp2( ))
          return;
     )
     double       *v, *vX, *d, *dX;
     const char   *f, *fX;
     vX = vp(0,0);
     dX = dp(0,0);
     fX = fp(0,0);
     for (int x=0; x<dim__.x( ); ++x, ++vX, ++dX, ++fX)
     {
          v = vX;
          d = dX;
          f = fX;
     double    minV = *v;          // value on min end, just before span
     double*   minVp = 0;          // pointer to min end of span
```

APPENDIX A-continued

```
    double*  minDp = 0;
    int      len = 0;              // length of span
    v+=inc( ), d+=inc( ), f+=inc( );
    for      ( int y = 1;
      y < dim_.y( );
      ++y, v+=inc( ), d+=inc( ), f+=inc( ))
    {
            if (!minVp)
            {
                if (*f)
                {
                    minVp = v;      // note min end
                    minDp = d;
                    len = 1;
                }
                else
                {
                    minV = *v;
                }
            }
            else
            {
                if (*f)
                {
                    ++len;
                }
                else
                {
                    // at one past right end, time to interp
                    int      frac1  = 1;
                    int      frac2  = len;
                    double   v1     = minV;
                    double   v2     = *v;
                    double   *pv    = minVp;
                    double   *pd    = minDp;
                    for (;   frac2 >= 1;
                        ++frac1, --frac2, pv+=inc( ), pd+=inc( ))
                    {
                        double d = *pd + 1.0/frac1 + 1.0/frac2;
                        IgcAssert(d != 0);
                        *pv = (*pv + v1/frac1 + v2/frac2) / d;
                    }
                    // and reset
                    minV = *v;
                    minVp = 0;
                    minDp = 0;
                    len = 0;
                }
            }
        }
    }
}
/* 4.
Procedure "iterate"
// 4.
void ImfOp_DefectErase_OnePlane::iterate( )
{
    IGC_SCAF(if (!ImfOp_DefectErase_DoRelax( ))
        return;
    )
    int maxIter      = ImfOp_DefectErase_MaxIter( );
    double minErr    = ImfOp_DefectErase_MinErrorPPM( ) / 1000000.0;
    for (int i=0; i<maxIter; ++i)
    {
        double error;
        error = relax( ); // 4A
        error /= freeCount_;
        if (error < minErr)
            break;
    }
}
/* 4A.
Subprocedure "relax"
// 4A.
double ImfOp_DefectErase_OnePlane::relax( )
{
    double err=0;
    for (int x=2; x < dim_.x( )-2; ++x)
    foe (int y=2; y < dim_.y( )-2; ++y)
```

APPENDIX A-continued

```
            if (f(x,y))
            {
                double*   p=vp(x,y);
                double    v=*p;
                adjust(p);       // 4Ai.
                err +=fabs(v - *p);
            }
        return err;
}
/* 4Ai.
Subprocedure "adjust"
// 4Ai
inline void ImfOp__DefectErase__OnePlane::adjust(double* p)
{
#undef V
#define V(x,y)   (  *( p + (x) + inc( )*(y) ) )
        double v =
                8./20. * ( V(+1, 0) +V(-1, 0) + V( 0,-1) + V (0,+1) )
            - 2./20. * ( V(+1,+1) + V(-1,+1) + V(+1,-1) + V(-1,-1) )
            - 1./20. * ( V(+2, 0) + V( 0,+2) + V(-2, 0) + V( 0,-2) );
#undef V
        *p = v;
}
/* 5
Procedure "addBackNoise"
// 5.
void ImfOp__DefectErase__OnePlane::addBackNoise( )
{
        IGC__SCAF(if (!ImfOp__DefectErase__DoNoise( ))
            return;
        )
        //XXX1:
}
/* 6.
Procedure "copyPlaneToBuf"
// 6
void ImfOp__DefectErase__Work::copyPlaneToBuf(ImfOp__DefectErase__OnePlane& ep,
int comp)
{
        double*   vpY     = ep.vp(0,0);
        double*   vp;
        int       vInc    = ep.inc( );
        int       x,y;
        switch(ras__.depthLog2( ))
        {
        case 3:
            {
                IrsAccess<unsigned char> a(ras__);
                unsigned char* bY = a.ptr( );
                for(y=r__.minY( ); y<r__.maxY( ); ++y,bY+=a.incs( ).y( ),vpY+=vInc)
                {
                    unsigned char *b = bY;
                    vp = vpY;
                    for(x=r__.minX( ); x<r__.maxX( ); ++x, b+=a.incs( ).x( )++vp)
                    {
                        int v =    (int) round(*vp * 255);
                        if         (V < 0    ) v = 0;
                        else if    (v > 255) v = 255;
                        b[comp] = v;
                    }
                }
            }
            break;
        case 4:
            {
                IrsAccess<unsigned short> a(ras__);
                unsigned short* bY = a.ptr( );
                for(y=r__.minY( ); y<r__.maxY ( ); ++y,bY+=a.incs( ).y( ),vpY+=vInc)
                {
                    unsigned short *b = bY;
                    vp = vpY;
                    for(x=r__.minX( ); x<r__.maxX( ); ++x,b+=a.incs( ).x( ),++vp)
                    {
                        int v =    (int) round(*vp * 65535);
                        if         (v < 0       ) v = 0;
                        else if    (v > 65535) v = 65535;
                        b[comp] v;
                    }
                }
```

APPENDIX A-continued

```
        }
        break;
    default:
        IgcHurl( );
    }
}
```

What is claimed is:

1. A method of calculating new values for pixels in an image desired to be altered, comprising the steps of:

a) providing an image, said image including:

a region of one or more first pixels desired to be altered, and a perimeter surrounding said region and comprising second pixels having known values;

b) calculating a pixel value for each of said first pixels using linear interpolation based on at least a portion of said second pixels;

c) applying a smoothing function to said first pixels, wherein said function recalculates said pixel values for each of said first pixels based on the value of at least the first and second pixels adjacent the pixel being recalculated, said recalculation using the previously calculated pixel values for said first adjacent pixels; and d) repeating step c) if a stop condition is not satisfied, wherein said recalculation uses the previously recalculated pixel values for said first adjacent pixels.

2. The method of claim 1, further comprising the step of determining a sum of the changes in each of said first pixel values during each iteration of step c), wherein said stop condition is satisfied when said sum is smaller than a predetermined value.

3. The method of claim 1, further comprising the step of determining the average change in value of said first pixels during an iteration of step c), wherein said stop condition is satisfied when said average is smaller than a predetermined value.

4. The method of claim 1, further comprising the step of determining, for each iteration of step c), a maximum value corresponding to the change in value of one of said first pixels having the maximum change during step c), wherein said stop condition is satisfied when said maximum value is smaller than a predetermined value.

5. The method of claim 1, further comprising the step of entering an iteration number N, wherein said stop condition is satisfied if step c) has been repeated N times.

6. The method of claim 1, wherein said image is a digital image, and wherein said step of providing an image includes the step of selecting said first pixels with a computer generated brush.

7. The method of claim 1, wherein said image is a two-dimensional image, and wherein said calculating step b) uses four-way linear interpolation.

8. The method of claim 1, wherein said image is an N-dimensional image, wherein N is an integer greater than two.

9. The method of claim 1, wherein said smoothing function is a minimum curvature solution algorithm.

10. A method of enhancing a computer generated image, comprising the steps of:

a) acquiring a digital image;

b) selecting a portion of said image, said portion including a plurality of first pixels, said portion surrounded by second pixels having known values;

c) calculating a pixel value for each of said first pixels using linear interpolation based on the known values of at least a portion of said second pixels; and d) iteratively applying a minimum curvature algorithm to said first pixels until a stop condition is satisfied, wherein said algorithm recalculates said pixel values for each of said first pixels based on the value of at least the first and second pixels adjacent the pixel being recalculated, said recalculation using previously calculated pixel values for any of said first adjacent pixels.

11. The method of claim 10, further comprising the step of displaying said image using said recalculated values of said first pixels, after said stop condition is satisfied.

12. The method of claim 10, further comprising the step of determining a sum of the changes in each of said first pixel values during each iteration of step d), wherein said stop condition is satisfied when said sum is smaller than a predetermined value.

13. The method of claim 10, further comprising the step of determining the average change in value of said first pixels during each iteration of step d), wherein said stop condition is satisfied when said average is smaller than a predetermined value.

14. The method of claim 10, further comprising the step of determining, for each iteration of step d), a maximum value corresponding to the change in value of one of said first pixels having the maximum change during step d), wherein said stop condition is satisfied when said maximum value is smaller than a predetermined value.

15. The method of claim 10, further comprising the step of entering an iteration number N, wherein said stop condition is satisfied if step d) has been repeated N times.

16. The method of claim 10, wherein said step of selecting includes the step of selecting said first pixels with a computer generated brush.

17. The method of claim 10, wherein said digital image is a two-dimensional digital image, and wherein said calculating step b) uses four-way linear interpolation.

18. The method of claim 10, wherein said digital image is an N-dimensional digital image, wherein N is an integer greater than two.

19. The method of claim 10, wherein said smoothing function is a minimum curvature solution algorithm.

20. An image processing system, comprising:

a) means for providing an image;

b) means for selecting a portion of said image, said portion including a plurality of first pixels, said portion surrounded by second pixels having known values;

c) a processor, wherein said processor calculates an initial pixel value for each of said first pixels using linear interpolation based on the known values of at least a portion of said second pixels, and wherein the processor thereafter iteratively applies a smoothing function to each of said first pixels until a stop condition has been satisfied, said function recalculating each of said first pixel values using the pixel values of at least the pixels adjacent the pixel being recalculated; and d) means for displaying said image using the recalculated values of said first pixels after said stop condition has been satisfied.

21. The system of claim 20, wherein said means for displaying includes one of a monitor and a printer.

22. The system of claim 20, wherein said means for selecting includes a computer generated brush.

23. The system of claim 20, wherein said providing means includes means for providing a two-dimensional digital image, and wherein said processor calculates said initial pixel values using four-way linear interpolation.

24. The system of claim 20, wherein said providing means includes means for providing an N-dimensional digital image, wherein N is an integer greater than two.

25. The system of claim 20, wherein said smoothing function is a minimum curvature solution algorithm.

26. The system of claim 20, wherein said processor further determines a sum of the changes in each of said first pixel values during each iteration of said smoothing function, and wherein said stop condition is satisfied when said sum is smaller than a predetermined value.

27. The system of claim 20, wherein said processor further determines the average change in value of said first pixels during each iteration of said smoothing function, wherein said stop condition is satisfied when said average is smaller than a predetermined value.

28. The system of claim 20, wherein said processor further determines, for each iteration of said smoothing function, a maximum value corresponding to the change in value of one of said first pixels having the maximum change during each iteration, wherein said stop condition is satisfied when said maximum value is smaller than a predetermined value.

29. The system of claim 20, further comprising means for entering an iteration number N, wherein said stop condition is satisfied when said smoothing function has been applied N times.

* * * * *